US012588031B2

(12) United States Patent
Papasakellariou

(10) Patent No.: US 12,588,031 B2
(45) Date of Patent: Mar. 24, 2026

(54) DOWNLINK CONTROL SIGNALING FOR MULTICAST AND UNICAST COMMUNICATIONS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 872 days.

(21) Appl. No.: 17/806,454

(22) Filed: Jun. 10, 2022

(65) Prior Publication Data

US 2022/0417979 A1 Dec. 29, 2022

Related U.S. Application Data

(60) Provisional application No. 63/215,227, filed on Jun. 25, 2021.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0053* (2013.01); *H04W 4/06* (2013.01); *H04W 76/28* (2018.02)

(58) Field of Classification Search
CPC ....... H04W 72/23; H04W 4/06; H04W 76/28; H04W 72/232; H04W 72/0446;
(Continued)

(56) References Cited

U.S. PATENT DOCUMENTS

2018/0376511 A1   12/2018   Tsai et al.
2021/0136689 A1   5/2021   Kim et al.
(Continued)

FOREIGN PATENT DOCUMENTS

EP        3809761 A1    4/2021
WO     2022077323 A1    4/2022

OTHER PUBLICATIONS

International Search Report and Written Opinion issued Sep. 23, 2022 regarding International Application No. PCT/KR2022/009078, 7 pages.
(Continued)

*Primary Examiner* — Marisol Figueroa

(57) ABSTRACT

Methods and apparatuses for downlink control signaling for multicast and unicast communications. A method includes receiving information for first search space sets and for second search space sets, and a physical downlink control channel (PDCCH) providing a downlink control information (DCI) format. The DCI format provides an indication for receptions of PDCCHs during an active time of a next DRX cycle according to one of: none of the first search space sets and the second search space sets, only the first search space sets, only the second search space sets, or the first search space sets and the second search space sets. The method further includes determining reception of zero or more PDCCHs for the first and second search space sets during the active time of the next DRX cycle based on the indication and receiving the PDCCHs during the active time of the next DRX cycle.

17 Claims, 9 Drawing Sheets

(51) Int. Cl.
*H04W 4/06*          (2009.01)
*H04W 76/28*        (2018.01)

(58) Field of Classification Search
CPC ... H04L 5/0053; H04L 5/0064; H04L 5/0023;
Y02D 30/70
See application file for complete search history.

(56)                    References Cited

U.S. PATENT DOCUMENTS

| | | | |
|---|---|---|---|
| 2022/0124788 A1* | 4/2022 | Kittichokechai | ..... H04L 1/0008 |
| 2022/0232609 A1* | 7/2022 | Lee | ..................... H04W 72/569 |
| 2023/0247633 A1* | 8/2023 | Liu | ..................... H04L 27/2605 |
| | | | 370/329 |

OTHER PUBLICATIONS

Qualcomm Incorporated, "DCI-based power saving adaptation during DRX Active Time", 3GPP TSG RAN WG1 Meeting #105-e, R1-2104684, May 2021, 4 pages.
Huawei et al., "Resource configuration and group scheduling for RRC_CONNECTED UEs", 3GPP TSG RAN WG1 Meeting #105-e, R1-2104248, May 2021, 6 pages.
"3rd Generation Partnership Project; Technical Specification Group Radio Access Network; NR; Physical channels and modulation (Release 16)", 3GPP TS 38.211 V16.6.0, Jun. 2021, 134 pages.
"3rd Generation Partnership Project; Technical Specification Group Radio Access Network; NR; Multiplexing and channel coding (Release 16)", 3GPP TS 38.212 V16.6.0, Jun. 2021, 153 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.6.0, Jun. 2021, 172 pages.
"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
Extended European Search Report issued Oct. 11, 2024 regarding Application No. 22828836.1, 15 pages.
Moderator (CMCC), "Summary#7 on mechanisms to support group scheduling for RRC_CONNECTED UEs for NR MBS", 3GPP TSG RAN WG1 #105-e, R1-2106304, May 2021, 116 pages.
Samsung , "Support of group scheduling for RRC_CONNECTED UEs", 3GPP TSG RAN WG1 #105, R1-2105336, May 2021, 5 pages.

* cited by examiner

1100

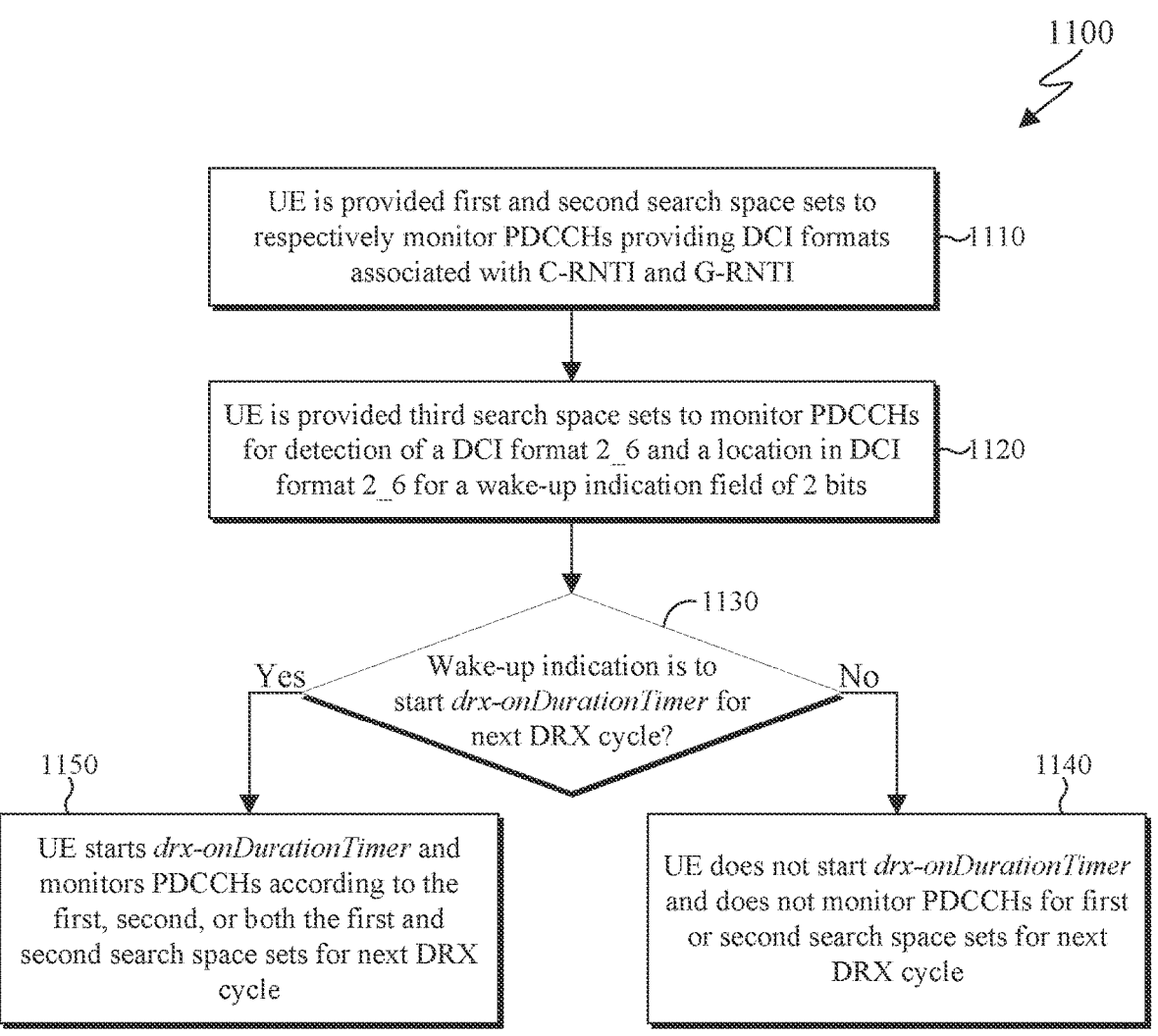

UE is provided first and second search space sets to respectively monitor PDCCHs providing DCI formats associated with C-RNTI and G-RNTI ~1110

UE is provided third search space sets to monitor PDCCHs for detection of a DCI format 2_6 and a location in DCI format 2_6 for a wake-up indication field of 2 bits ~1120

1130

Wake-up indication is to start *drx-onDurationTimer* for next DRX cycle?

Yes                                   No

1150

UE starts *drx-onDurationTimer* and monitors PDCCHs according to the first, second, or both the first and second search space sets for next DRX cycle

1140

UE does not start *drx-onDurationTimer* and does not monitor PDCCHs for first or second search space sets for next DRX cycle

FIG. 11

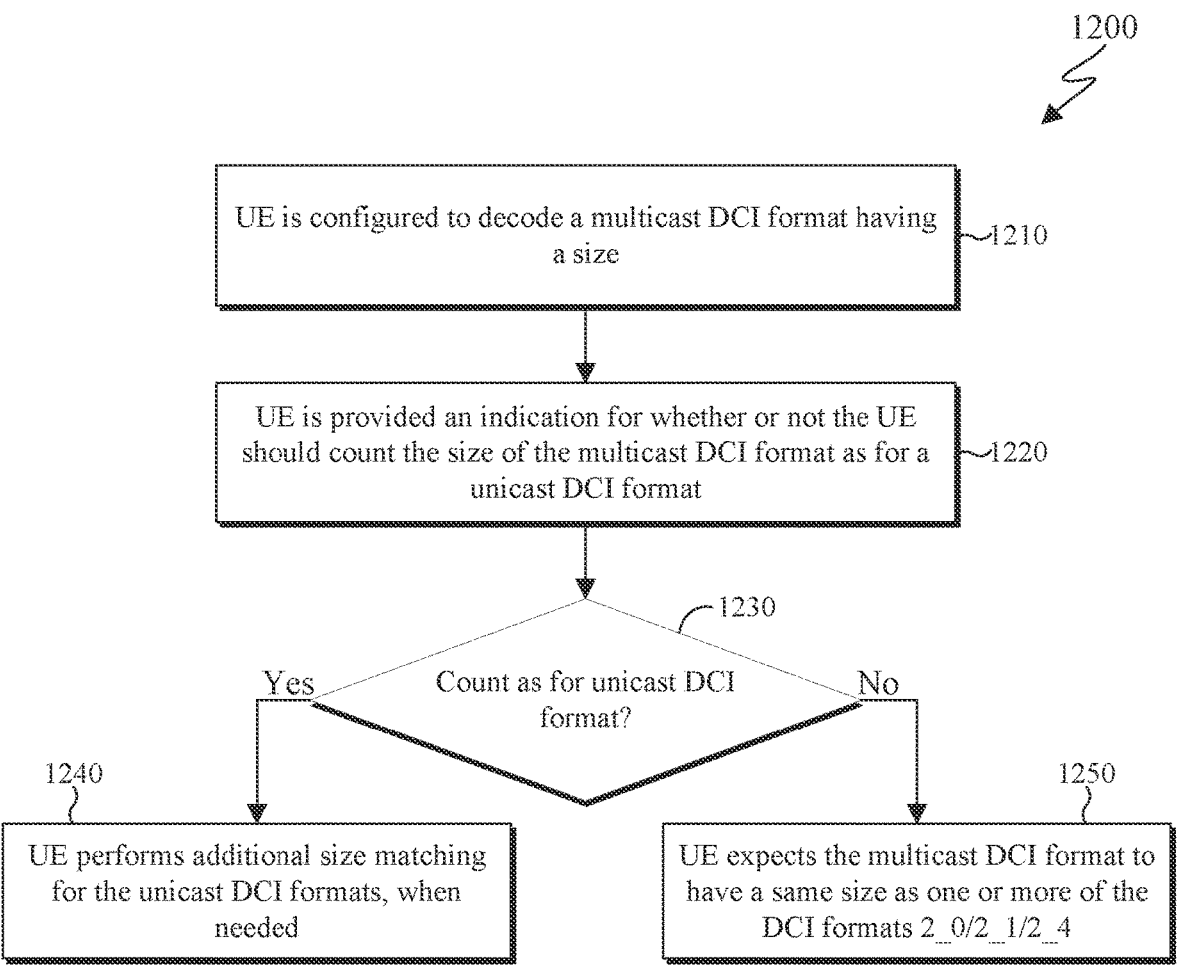

1200

UE is configured to decode a multicast DCI format having a size ~1210

UE is provided an indication for whether or not the UE should count the size of the multicast DCI format as for a unicast DCI format ~1220

1230

Count as for unicast DCI format?

Yes

No

1240

UE performs additional size matching for the unicast DCI formats, when needed

1250

UE expects the multicast DCI format to have a same size as one or more of the DCI formats 2_0/2_1/2_4

FIG. 12

DOWNLINK CONTROL SIGNALING FOR MULTICAST AND UNICAST COMMUNICATIONS

CROSS-REFERENCE TO RELATED APPLICATION AND CLAIM OF PRIORITY

This application claims priority under 35 U.S.C. § 119(e) to U.S. Provisional Patent Application No. 63/215,227 filed on Jun. 25, 2021. The above-identified provisional patent application is hereby incorporated by reference in its entirety.

TECHNICAL FIELD

The present disclosure relates generally to wireless communication systems and, more specifically, the present disclosure relates to downlink control signaling such as for multicast and unicast communications.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to downlink control signaling for multicast and unicast communications.

In one embodiment, a method is provided. The method includes receiving information for first search space sets and for second search space sets, and a physical downlink control channel (PDCCH) providing a downlink control information (DCI) format. Reception of the PDCCH is outside an active time of a discontinuous reception (DRX) cycle. The DCI format provides an indication for receptions of PDCCHs during an active time of a next DRX cycle according to one of: none of the first search space sets and the second search space sets, only the first search space sets, only the second search space sets, or the first search space sets and the second search space sets. The method further includes determining reception of zero or more PDCCHs for the first and second search space sets during the active time of the next DRX cycle based on the indication and receiving the PDCCHs during the active time of the next DRX cycle.

In another embodiment, a user equipment (UE) is provided. The UE includes a transceiver configured to receive information for first search space sets and for second search space sets and a PDCCH providing a DCI format. Reception of the PDCCH is outside an active time of a DRX cycle. The DCI format provides an indication for receptions of PDCCHs during an active time of a next DRX cycle according to one of: none of the first search space sets and the second search space sets, only the first search space sets, only the second search space sets, or the first search space sets and the second search space sets. The UE further includes a processor operably coupled to the transceiver, the processor configured to determine reception of zero or more PDCCHs for the first and second search space sets during the active time of the next DRX cycle based on the indication. The transceiver is further configured to receive the PDCCHs during the active time of the next DRX cycle.

In yet another embodiment, a base station is provided. The base station includes a transceiver configured to transmit information for first search space sets and for second search space sets and a PDCCH providing a DCI format. Transmission of the PDCCH is outside an active time of a DRX cycle. The DCI format provides an indication for transmissions of PDCCHs during an active time of a next DRX cycle according to one of: none of the first search space sets and the second search space sets, only the first search space sets, only the second search space sets, or the first search space sets and the second search space sets. The base station further includes a processor operably coupled to the transceiver. The processor is configured to determine transmission of zero or more PDCCHs for the first and second search space sets during the active time of the next DRX cycle based on the indication. The transceiver is further configured to transmit the PDCCHs during the active time of the next DRX cycle.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example method for a UE to receive an indication for whether to start a drx-onDurationTimer for a next discontinuous reception (DRX) cycle to monitor PDCCH for detection of DCI formats associated with a group radio network temporary identifier (G-RNTI) according to embodiments of the present disclosure; and FIG. 12 illustrates an example method for a UE to determine a size for a multicast DCI format according to embodiments of the present disclosure.

DETAILED DESCRIPTION

Figure 1:
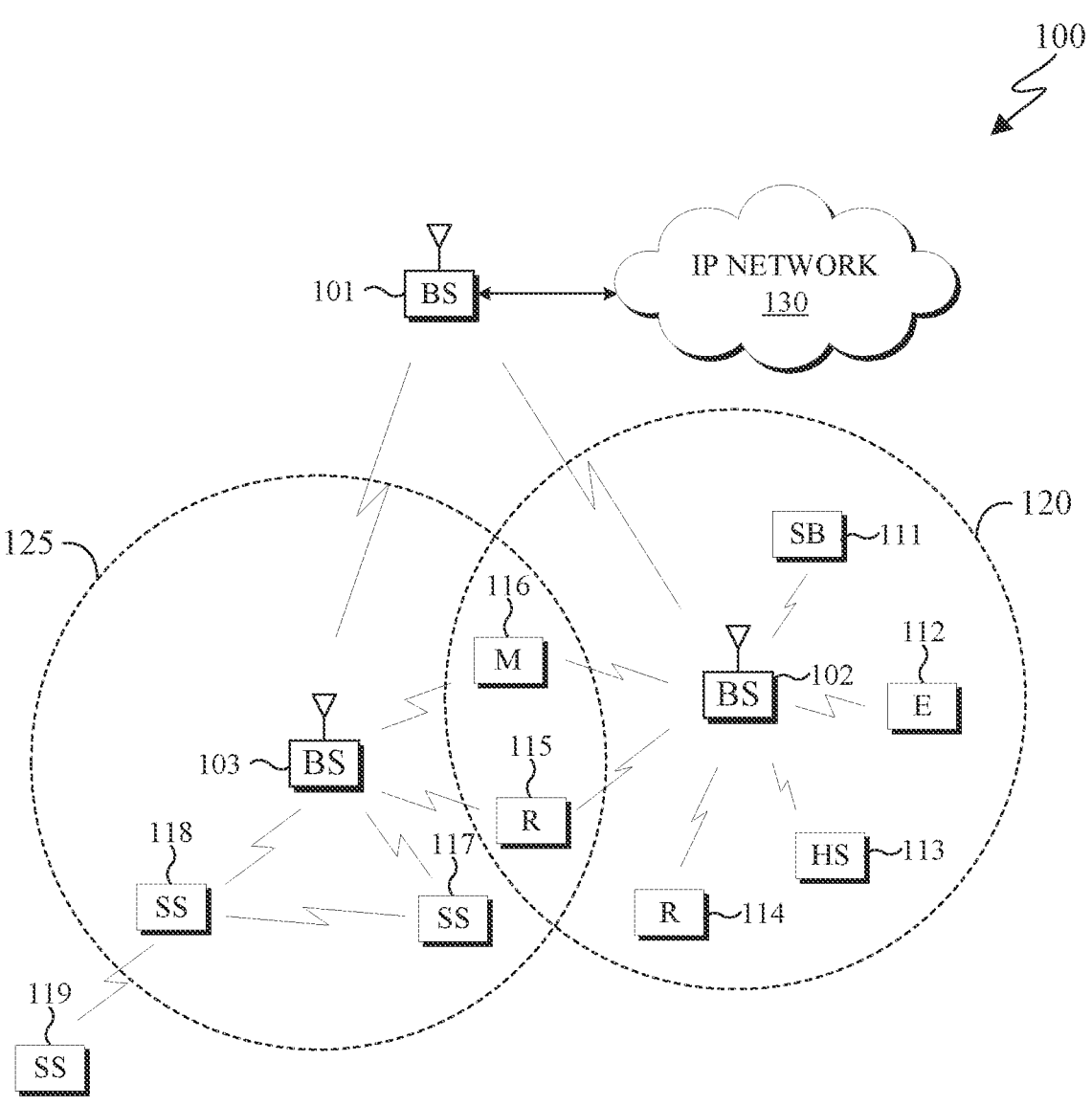
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" ("REF1"); 3GPP TS 38.212 v16.6.0, "NR; Multiplexing and Channel coding" ("REF2"); 3GPP TS 38.213 v16.6.0, "NR; Physical Layer Procedures for Control" ("REF3"); 3GPP TS 38.214 v16.6.0, "NR; Physical Layer Procedures for Data" ("REF4"); 3GPP TS 38.321 v16.5.0, "NR; Medium Access Control (MAC) protocol specification" ("REF5"); and 3GPP TS 38.331 v16.5.0, "NR; Radio Resource Control (RRC) Protocol Specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
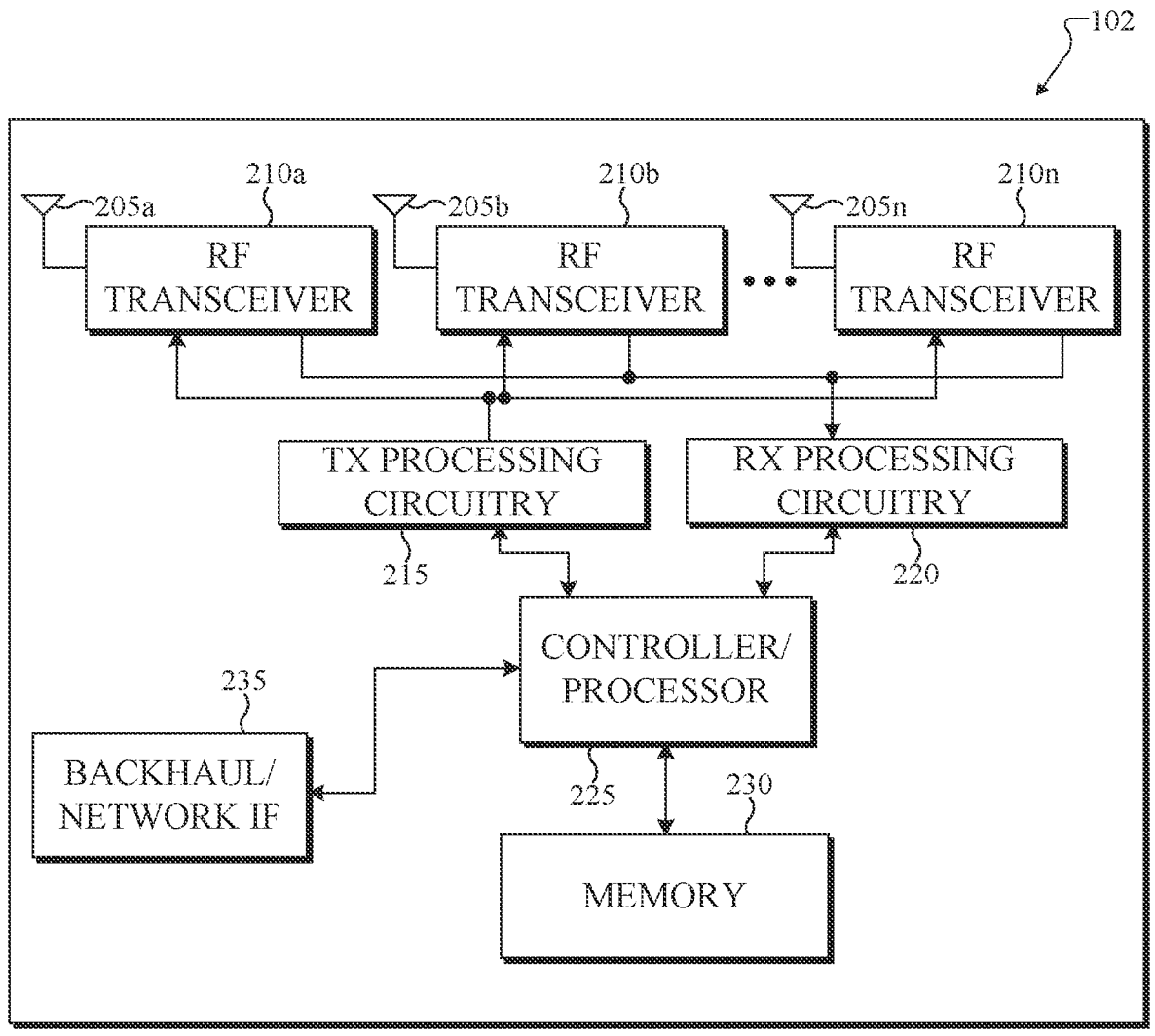
FIG. 2 illustrates an example base station (BS) according to embodiments of the present disclosure.
Figure 3:
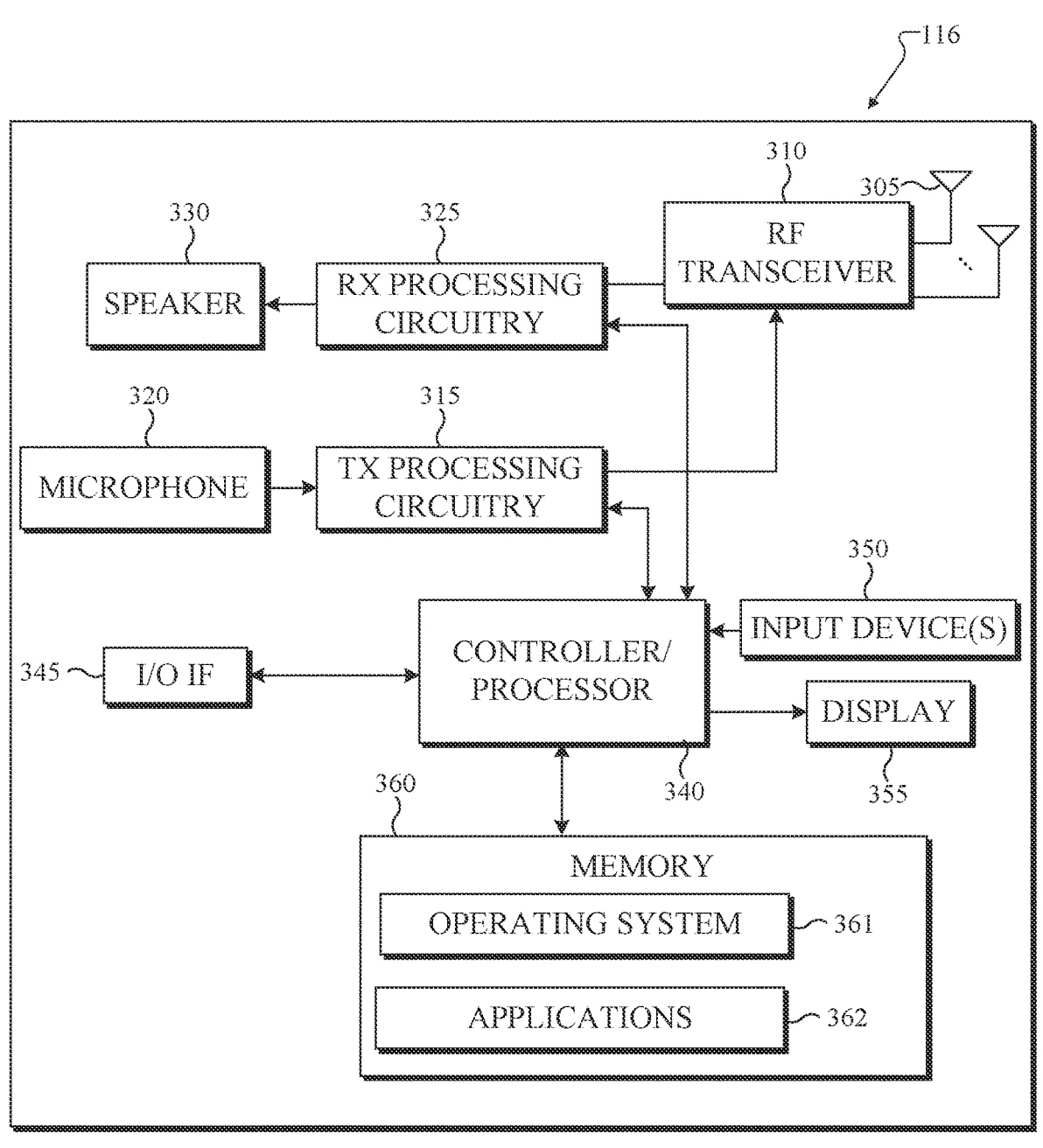
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (gNB) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, circuitry, programing, or a combination thereof for downlink control signaling for multicast and unicast communications. In certain embodiments, and one or more of the BSs 101-103 includes circuitry, programing, or a combination thereof for downlink control signaling for multicast and unicast communications.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support downlink control signaling for multicast and unicast communications. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
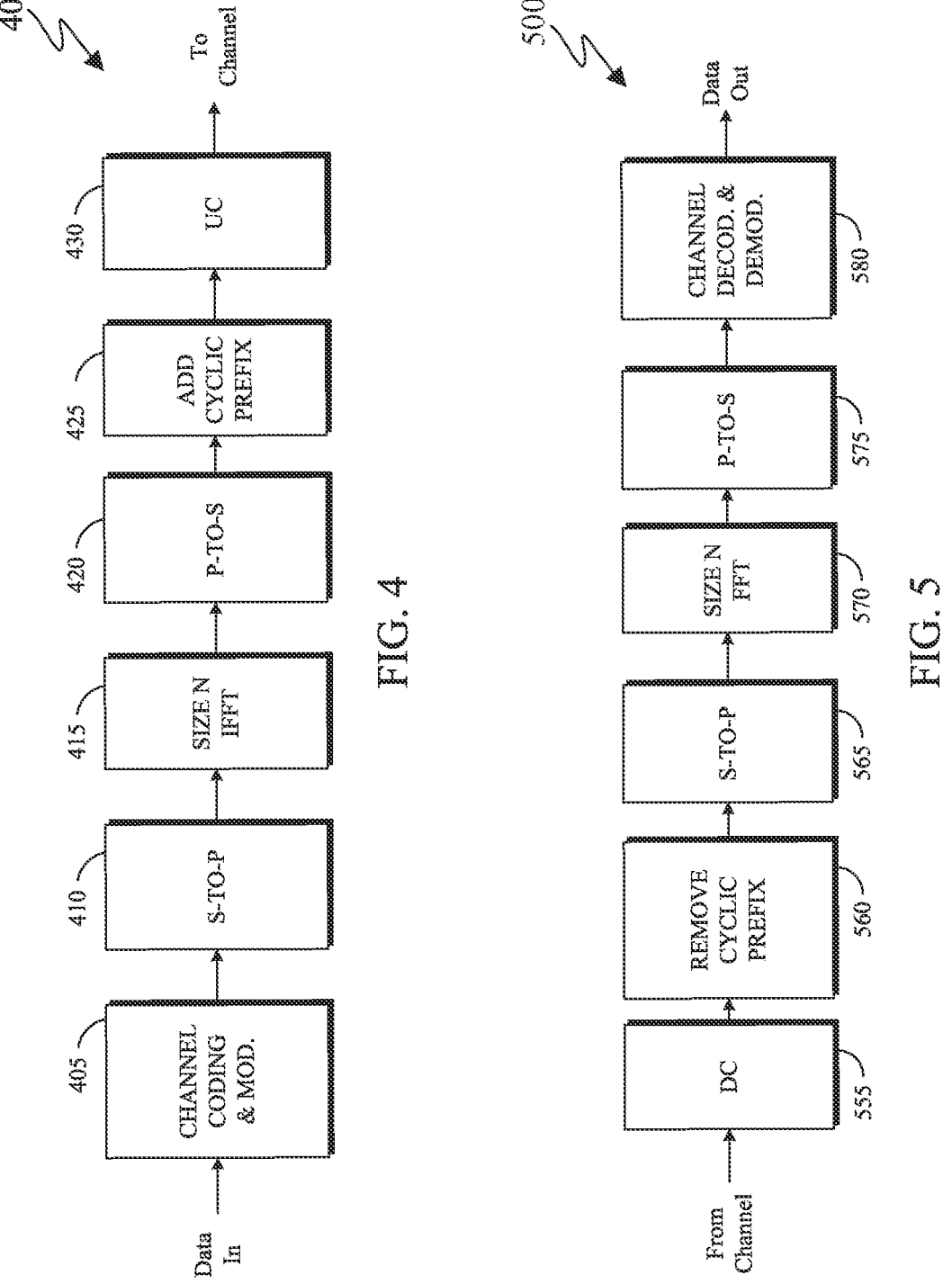
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support downlink control signaling for multi-cast and unicast communications as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BS s 101-103 and may implement the receive path 500 for receiving in the down-link from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of trans-forms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wire-less transmit and receive paths, various changes may be made to FIG. 4 and FIG. 5. For example, various compo-nents in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

As described below, italicized text of a parameter indi-cates that the parameter is provided by higher layers.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configu-ration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), and reference signals (RS) that are also known as pilot signals. A gNB (such as the BS 102) transmits data information or DCI through respective physical DL shared channels (PDSCHs) or physical DL control channels (PDCCHs). A PDCCH transmission is over a number of control channel elements (CCEs), from a predetermined set of numbers of CCEs, referred to as CCE aggregation level.

A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception.

A DCI format can include a priority indicator field providing a priority value for a scheduled PDSCH reception or PUCCH transmission with corresponding hybrid automatic repeat request acknowledgement (HARQ-ACK) information, or a priority value for a scheduled PUSCH transmission. The priority indicator can be associated with the PUCCH or the HARQ-ACK information and with the PDSCH reception corresponding to the HARQ-ACK information. For example, when the priority indicator in a DCI format scheduling a PDSCH reception has value 0 or value 1, an associated PDSCH reception, HARQ-ACK information, or PUCCH transmission with the HARQ-ACK information has priority 0 or priority 1. When the priority indicator field is absent from the DCI format, the priority value is equal to zero.

A gNB (such as the BS 102) transmits one or more of multiple types of RS including channel state information RS (CSI-RS) and demodulation RS (DM-RS)—see REF1. A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF5). The CSI-IM resources can also be associated with a zero power CSI-RS (ZP CSI-RS) configuration. A UE can determine CSI-RS reception parameters through DL control signaling or higher layer signaling, such as RRC signaling from a gNB (see also REF5). A DM-RS is typically transmitted only within a BW of a respective PDCCH or PDSCH and a UE can use the DM-RS to demodulate data or control information.

UL signals can also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access (see also REF1). A UE transmits data information or UCI through a respective physical UL shared channel (PUSCH) or a physical UL control channel (PUCCH). When a UE simultaneously transmits data information and UCI, the UE can multiplex both in a PUSCH or, depending on a UE capability, transmit both a PUSCH with data information and a PUCCH with UCI.

UCI can include HARQ-ACK information, indicating correct or incorrect decoding of transport blocks (TBs) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE (such as the UE 116). HARQ-ACK information is either a positive acknowledgement (ACK) when a TB decoding is correct or a negative acknowledgement (NACK) when a TB decoding is incorrect.

UL RS can include DM-RS and SRS. DM-RS and is typically transmitted within a BW of a respective PUSCH or PUCCH. A gNB (such as the UE 116) can use a DM-RS to demodulate information in a respective PUSCH or PUCCH. SRS is transmitted by a UE to provide a gNB with an UL CSI and, for a TDD system, to also provide a precoder matrix indicator (PMI) for DL transmission. Further, as part of a random-access procedure or for other purposes, a UE can transmit a physical random-access channel (PRACH).

DL receptions and UL transmissions by a UE (such as the UE 116) can be configured to occur in a corresponding DL bandwidth part (BWP) and UL BWP. A DL/UL BWP is smaller than or equal to a DL/UL bandwidth of a serving cell. Multicast (or groupcast) PDSCH receptions can occur in a common frequency region for a group of UEs, wherein the common frequency region is within an active DL BWP for each UE from the group of UEs. DL transmissions from a gNB and UL transmissions from a UE can be based on an OFDM waveform including a variant using DFT preceding that is known as DFT-spread-OFDM (see also REF1).

Figures 6, 7:
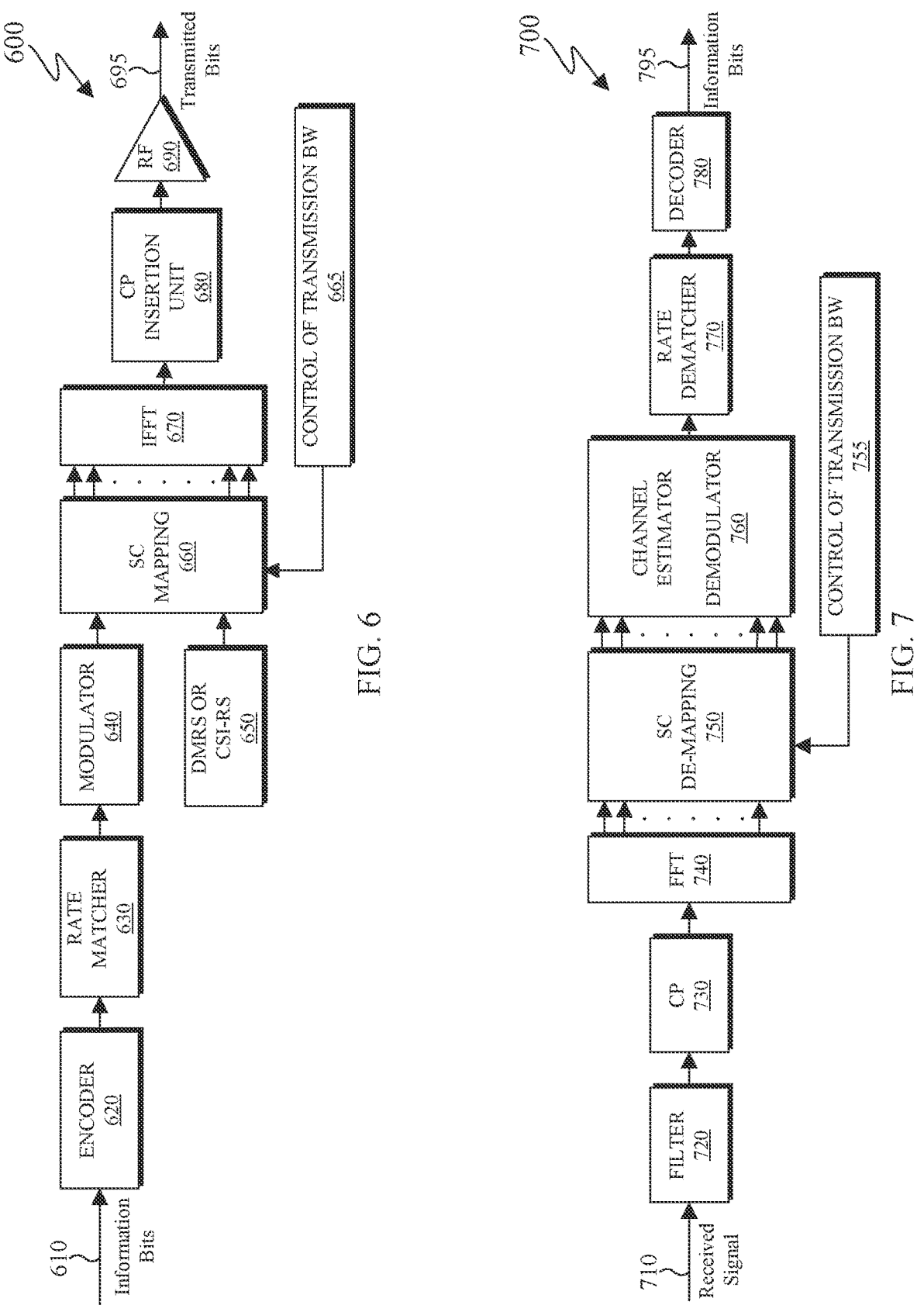
FIG. 6 illustrates a block diagram of an example transmitter structure using orthogonal frequency division multiplexing (OFDM) according to embodiments of the present disclosure.
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DM-RS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) can be configured to receive both unicast PDSCH and multicast PDSCH. The UE can identify whether a PDSCH reception is a unicast one or a multicast one based on the DCI format scheduling the PDSCH reception or based on a configuration by higher layers when the PDSCH reception is not scheduled by a DCI format. For example, a DCI format with cyclic redundancy check (CRC)scrambled by a first group radio network temporary identifier (RNTI), such as a cell-RNTI (C-RNTI), or having a field indicating a first PDSCH type, such as unicast PDSCH, can be used to schedule a unicast PDSCH reception while a DCI format with CRC scrambled by a second RNTI, such as a group-RNTI (G-RNTI), or having a field indicating a second PDSCH type, such as multicast PDSCH, can be used to schedule a multicast PDSCH reception. For brevity, DCI formats with CRC scrambled by C-RNTI, or configured scheduling RNTI (CS-RNTI), or MCS-C-RNTI, are referred to as unicast DCI formats and DCI formats with CRC scrambled by a G-RNTI are referred to as multicast DCI formats.

Figures 8, 9:
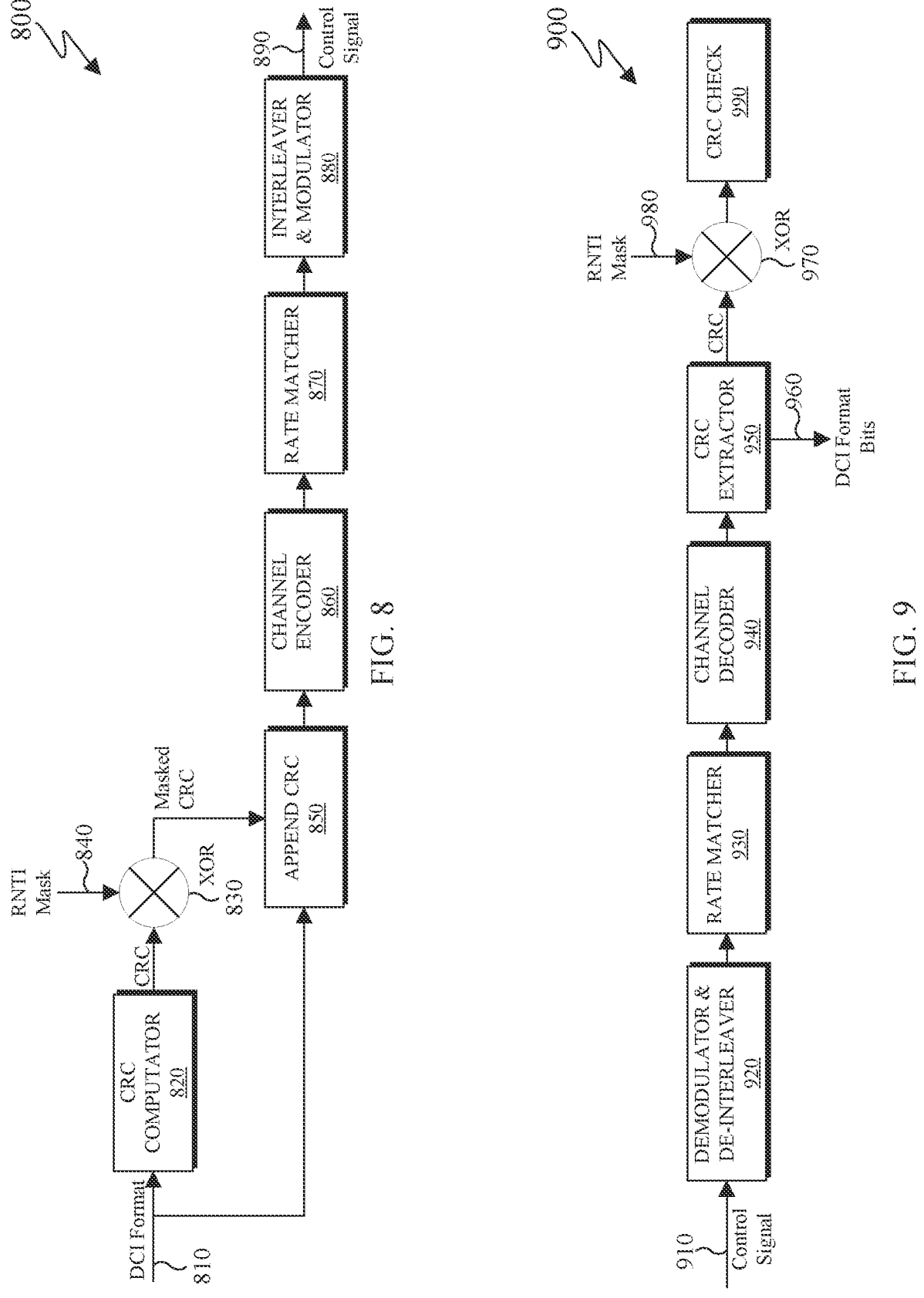
FIG. 8 illustrates an example encoding process for a downlink control information (DCI) format according to embodiments of the present disclosure.
FIG. 9 illustrates an example decoding process for a DCI format for use with a UE according to embodiments of the present disclosure.

FIG. 8 illustrates an example encoding process 800 for a DCI format according to embodiments of the present disclosure. FIG. 9 illustrates an example decoding process 900 for a DCI format for use with a UE according to embodiments of the present disclosure. The encoding process 800 of FIG. 8 and the decoding process 900 of FIG. 9 are for illustration only and other embodiments can be used without departing from the scope of the present disclosure.

A BS separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format.

As illustrated in FIG. 8, the CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR (0,0)=0, XOR (0,1)=1, XOR (1,0)=1, XOR (1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

As illustrated in FIG. 9, a received control signal 910 is demodulated and de-interleaved by a demodulator and a de-interleaver 920. A rate matching applied at a BS transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (checksum is zero), the DCI format information bits are considered to be valid. When the CRC check does not succeed, the DCI format information bits are considered to be invalid.

In certain embodiments, a UE (such as the UE 116) expects to monitor PDCCH candidates for up to four sizes of DCI formats that include up to three sizes of DCI formats with CRC scrambled by C-RNTI per serving cell. The UE counts a number of sizes for DCI formats per serving cell based on a number of configured PDCCH candidates in respective search space sets for the corresponding active DL BWP. When the UE is configured to monitor PDCCH for detection of multicast DCI formats, an objective is to maintain the maximum of four sizes of DCI formats per serving cell while avoiding constraints in scheduling flexibility of unicast traffic or multicast traffic.

A PDCCH transmission can be within a set of PRBs. A gNB (such as the BS 102) can configure a UE (such as the UE 116) one or more sets of PRB sets, also referred to as determining control resource sets (CORESETs), for PDCCH receptions (see also REF3). A CORESET can be associated with transmission configuration indication (TCI) state that defines quasi-collocation properties for PDCCH receptions in the CORESETs. A PDCCH reception can be in CCEs that are included in a CORESET. A maximum number of PDCCH candidates $M_{PDCCH}^{max,slot,\mu}$ and a maximum number of non-overlapping CCEs $C_{PDCCH}^{max,slot,\mu}$ for the reception of PDCCH candidates can be defined per slot. Non-overlapping CCEs are CCEs with different indexes or in different symbols of a CORESET or in different CORESETs. For a UE configured for operation with carrier aggregation (CA), the UE is not required to monitor on the active DL BWP with SCS configuration $\mu$ of the scheduling cell more than $min(M_{PDCCH}^{max,slot,\mu}, M_{PDCCH}^{total,slot,\mu})$ PDCCH candidates or more than $min(C_{PDCCH}^{max,slot,\mu}, C_{PDCCH}^{total,slot,\mu})$ non-overlapped CCEs per slot. It is noted that $M_{PDCCH}^{total,slot,\mu}$ and $C_{PDCCH}^{total,slot,\mu}$ are defined in REF3.

In certain embodiments, a UE (such as the UE 116) determines CCEs for decoding a PDCCH candidate based on a search space (see also REF3). For some RNTIs, such as a C-RNTI, a set of PDCCH candidates for respective DCI formats defines corresponding UE-specific search space (USS) sets (see also REF3 and REF5). For other RNTIs, such as a system information RNTI (SI-RNTI), a set of PDCCH candidates for respective DCI formats defines corresponding common search space (CSS) sets. A search space set is associated with a CORESET where the UE monitors PDCCH candidates for the search space set. The term PDCCH monitoring includes a reception of a PDCCH candidate, and a decoding of a DCI format associated with the PDCCH candidate for a corresponding search space set.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are described in Equation (1), below. In Equation (1), for any CSS, $Y_{p,di\,s,f}^{\mu}=0$. Additionally, for a USS, $Y_{p,n_{s,f}}^{\mu}$, is described in Equation (2), below. In Equation (2), $Y_{p,-1}=n_{RNTI}\neq0$, $A_p=39827$ for pmod3=0, $A_p=39829$ for pmod3=1, $A_p=39839$ for pmod3=2, and D=65537. In Equation (1), i=0, . . . , L−1. Additionally, in Equation (1), $N_{CCE,p}$ is a number of CCEs, numbered from 0 to $N_{CCE,p}-1$, in CORESET p. The expression, $n_{CI}$, of Equation (1), is a carrier indicator field value if the UE is configured with a carrier indicator field for the serving cell on which PDCCH is monitored; otherwise, including for any CSS, $n_{CI}=0$. Additionally, in Equation (1) the expression, $m_{s,n_{CI}}=0, . . . , M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. It is noted that for any CSS, $M_{s,max}^{(L)}=M_{s,0}^{(L)}$. Additionally, for a USS, $M_{s,max}^{(L)}$ is the maximum of $M_{s,n_{CI}}^{(L)}$ over all configured $n_{CI}$ values for a CCE aggregation level L of search space set s. In Equation (1), the RNTI value used for $n_{RNTI}$ is the C-RNTI.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \qquad (1)$$

$$Y_{p,n_{s,f}^{\mu}} = \left( A_p \cdot Y_{p,n_{s,f}^{\mu}-1} \right) \bmod D \qquad (2)$$

Based on a configuration of search space sets for a primary cell, a UE (such as the UE 116) may need to monitor in a slot a number of PDCCH candidates or a number of non-overlapping CCEs for the primary cell that exceed corresponding numbers of PDCCH candidates or non-overlapping CCEs that the UE is required to monitor per slot for the primary cell. In such case, the UE expects that a number of PDCCH candidates and a number of non-overlapping CCEs for monitoring PDCCH according to CSS sets do not exceed corresponding numbers of PDCCH candidates and non-overlapping CCEs that the UE is required to monitor per slot for the primary cell and then the UE allocates PDCCH candidates and non-overlapping CCEs to USS sets in an ascending order of a USS set index until a last USS set that results to a total number of PDCCH candidates and a total number of non-overlapping CCEs for the primary cell that do not exceed the corresponding numbers of PDCCH candidates and non-overlapping CCEs that the UE is required to monitor per slot for the primary cell.

In certain embodiments, if a UE (such as the UE 116) (i) is configured for single cell operation or for CA operation in a same frequency band, and (ii) monitors PDCCH candidates in overlapping PDCCH monitoring occasions in multiple CORESETs that have been configured with same or different qcl-Type set to 'typeD' properties on active DL BWP(s) of one or more cells, wherein 'typeD' quasi-collocation properties refer to spatial parameters as described in REF4, then the UE monitors PDCCHs only in a CORESET. It is noted that in any other CORESET from the multiple CORESETs that have been configured with qcl-Type set to same 'typeD' properties as the CORESET, on the active DL BWP of a cell from the one or more cells (i) the CORESET corresponds to the CSS set with the lowest index in the cell with the lowest index containing CSS, if any; otherwise, to the USS set with the lowest index in the cell with lowest index; (ii) the lowest USS set index is determined over all USS sets with at least one PDCCH candidate in overlapping PDCCH monitoring occasions; (iii) for the purpose of determining the CORESET, a synchronization signal/physical broadcast channel (SS/PBCH) block is considered to have different quasi co-located (QCL) 'typeD' properties than a CSI-RS; (iv) for the purpose of determining the CORESET, a first CSI-RS associated with a SS/PBCH block in a first cell and a second CSI-RS in a second cell that is also associated with the SS/PBCH block are assumed to have same QCL 'typeD' properties; (v) the allocation of non-overlapping CCEs and of PDCCH candidates for PDCCH monitoring is according to all search space sets associated with the multiple CORESETs on the active DL BWP(s) of the one or more cells; (vi) the number of active TCI states is determined from the multiple CORESETs.

PDCCH monitoring for multicast DCI formats can be according to CSS sets while PDCCH monitoring for unicast DCI formats is according to USS sets with the exception of DCI format 0_0 or DCI format 1_0 that can also be associated with CSS sets. Therefore, considering for simplicity single cell operation and a primary cell, when a monitors PDCCH candidates in overlapping PDCCH monitoring occasions (MOs) in multiple CORESETs that have been configured with same or different qcl-Type set to 'typeD' properties on active DL BWP(s) of one or more cells, if the UE prioritizes PDCCH monitoring for a CORESET corresponding to the CSS set with the lowest index (and in any other CORESET from the multiple CORESETs that have been configured with qcl-Type set to same 'typeD' properties as the CORESET) on the active DL BWP of the primary cell, the UE would always monitor PDCCH for multicast services when the UE does not monitor PDCCH for non-multicast DCI formats in CCS sets for the overlapping PDCCH MOs. Embodiments of the present disclosure take into consideration that such default UE behavior can be detrimental as multicast services can have smaller priority that unicast services such as when unicast services are augmented reality (AR) or virtual reality (VR) ones or ones for ultra-reliable low latency communications (URLLC) because, unlike the typically infrequent PDCCH monitoring for CSS sets other than multicast ones, a UE may need to monitor PDCCH for multicast and PDCCH for unicast services in every slot.

In certain embodiments, a UE (such as the UE 116) that is configured with discontinuous reception (DRX) mode operation, can also be configured to monitor PDCCH on a primary cell, outside an Active Time for a DRX cycle, for detection of a DCI format, referred to as DCI format 2_6 with CRC bits scrambled by a power saving RNTI (PS-RNTI), and a location of a Wake-up indication bit in DCI format 2_6. A '0' value for the Wake-up indication bit, when reported to higher layers, indicates to not start the drx-onDurationTimer for the next long DRX cycle and a '1' value for the Wake-up indication bit, when reported to higher layers, indicates to start the drx-onDurationTimer for the next long DRX cycle. When the UE is configured search space sets to monitor PDCCH for detection of a DCI format 2_6 and the UE fails to detect the DCI format 2_6, the UE behavior for whether or not the UE starts the drx-onDurationTimer for the next DRX cycle on the primary cell can be configured by higher layers (to start the drx-onDurationTimer or to not start the drx-onDurationTimer). The drx-onDurationTimer is the duration at the beginning of a DRX cycle. When the UE has both multicast and unicast traffic, the buffer for multicast traffic or the buffer for unicast traffic for the UE can be empty prior to a start of a next DRX cycle. Although the UE needs to be indicated to wake up for a next DRX cycle when there is multicast or unicast traffic, it is beneficial for reducing UE power consumption and for maximizing a utilization of a PDCCH monitoring capability per slot per cell and minimizing search space set dropping due to exceeding a maximum number of PDCCH candidates or non-overlapping CCEs per slot, to also indicate to the UE whether the UE needs to monitor PDCCH for detection of either or both of multicast DCI formats and unicast DCI formats.

Accordingly, embodiments of the present disclosure take into consideration that there is a need to define procedures for a UE to determine CORESETs for PDCCH monitoring when the UE is configured for single cell operation, or for CA operation in a same frequency band, and has overlapping PDCCH monitoring occasions in multiple CORESETs with same or different qcl-Type set to 'typeD' properties.

Embodiments of the present disclosure also take into consideration that there is a need to define mechanisms for indicating to a UE whether to skip PDCCH monitoring or to monitor PDCCH for detection of unicast DCI formats, multicast DCI formats, or both during a next DRX cycle.

Embodiments of the present disclosure further take into consideration that there is a need to define procedures for a UE to count sizes of multicast DCI formats and unicast DCI formats.

Accordingly, embodiments of the present disclosure relate defining procedures for a UE to determine CORESETs for PDCCH monitoring when the UE is configured for single cell operation, or for CA operation in a same frequency band, and has overlapping PDCCH monitoring occasions in multiple CORESETs with same or different qcl-Type set to 'typeD' properties. Embodiments of the present disclosure also relate to defining mechanisms for indicating to a UE whether to skip PDCCH monitoring or to monitor PDCCH for detection of unicast DCI formats, multicast DCI formats, or both during a next DRX cycle. Embodiments of the present disclosure further relate to defining procedures for a UE to count sizes of multicast DCI formats and unicast DCI formats.

In the following, the term "higher layers" is used to denote control information that a UE is provided in a PDSCH reception, such as RRC or a MAC control element (CE).

For brevity, a CSS set associated with multicast DCI formats will be referred to as Type4-PDCCH CSS set but any other terminology, such as Type-3 PDCCH set, is also applicable. The specific terminology for such CSS set is not relevant to the functionality of the embodiments.

Embodiments of the present disclosure describe CORE-SET determination in overlapping PDCCH monitoring occasions of multicast CSS sets and unicast USS sets. This is described in the following examples and embodiments, such as those of FIG. 10.

Figure 10:
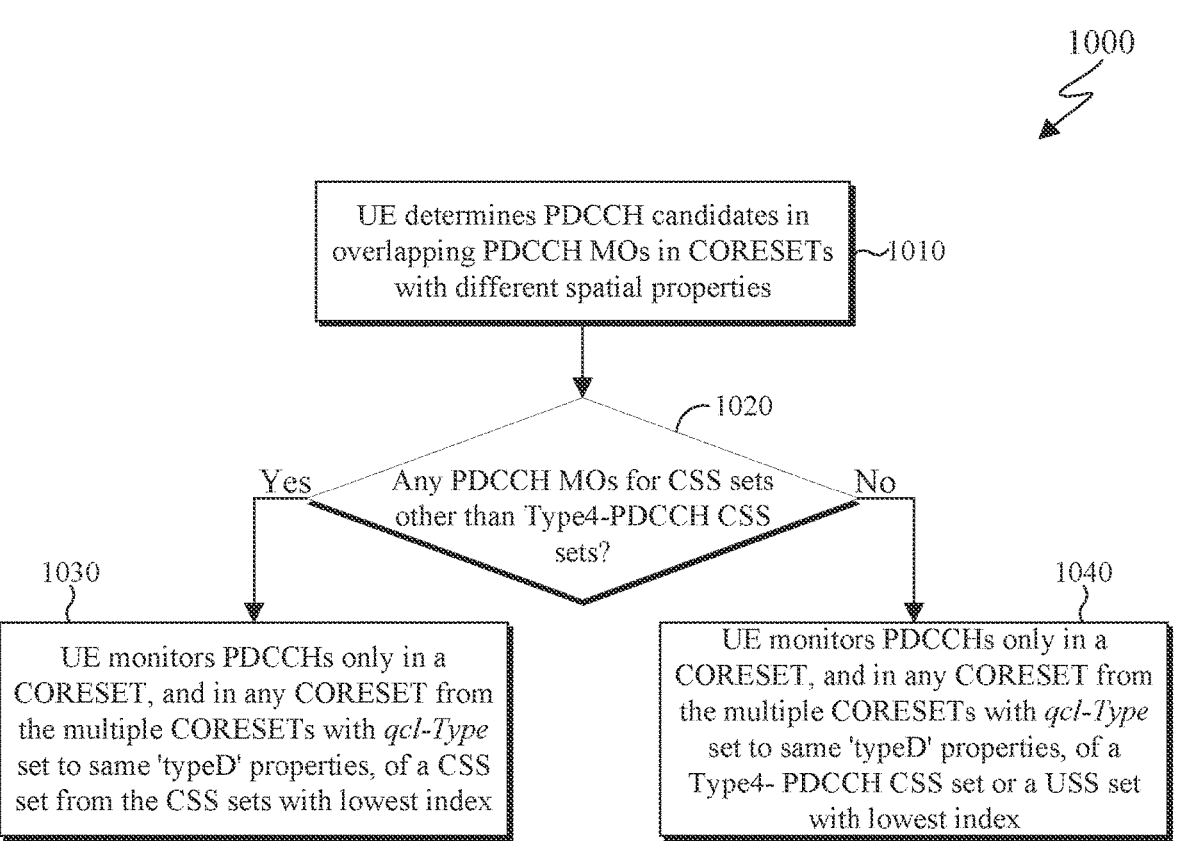
FIG. 10 illustrates an example method for determining control resource sets (CORESETs), with same or different qcl-Type set to 'typeD' properties, to monitor physical downlink control channel (PDCCH) in overlapping PDCCH monitoring occasions according to embodiments of the present disclosure.

FIG. 10 illustrates an example method 1000 for determining CORESETs, with same or different qcl-Type set to 'typeD' properties, to monitor PDCCH in overlapping PDCCH monitoring occasions according to embodiments of the present disclosure. The steps of the method 1000 of FIG. 10 can be performed by any of the UEs 111-119 of FIG. 1, such as the UE 116 of FIG. 3. The method 1000 is for illustration only and other embodiments can be used without departing from the scope of the present disclosure.

Embodiments of the present disclosure describe a determination by a UE of CORESETs to monitor PDCCH in time overlapping PDCCH monitoring occasions that include multiple CORESETs with same or different qcl-Type set to 'typeD' properties and include CSS sets for multicast DCI formats and USS sets for unicast DCI formats.

In order to avoid a default prioritization of multicast CSS sets over unicast USS sets for PDCCH monitoring in CORE-SETs with different qcl-Type set to 'typeD' properties, the prioritization for PDCCH monitoring is based on a search space set index regardless of whether the search space set is a CSS set for multicast DCI formats (Type4-PDCCH CSS set) or an USS set for unicast DCI formats. An exception is for CORESETs that are associated with both Type4-PDCCH CSS set and with CSS sets for other DCI formats, such as a Type0-PDCCH CSS set used for PDCCH receptions that provide a DCI format 1_0 scheduling system information updates or a Type3-PDCCH CSS set used for PDCCH receptions that provide a DCI format 2_0/2_1/2_2/2_3/2_4.

When overlapping PDCCH monitoring occasions for a UE are associated with PDCCH receptions in CORESETs with different qcl-Type set to 'typeD' properties and include Type4-PDCCH CSS sets and USS sets, the UE applies the following procedure for determining CORESETs to monitor PDCCH.

For example, if a UE (such as the UE 116) (i) is configured for single cell operation or for CA operation in a same frequency band, and (ii) monitors PDCCH candidates in overlapping PDCCH monitoring occasions in multiple CORESETs that have been configured with same or different qcl-Type set to 'typeD' properties on active DL BWP(s) of one or more cells, then the UE monitors PDCCHs only in a CORESET, and in any other CORESET from the multiple CORESETs that have been configured with qcl-Type set to same 'typeD' properties as the CORESET, on the active DL BWP of a cell from the one or more cells. In this example, the CORESET corresponds to the CSS set with the lowest index, other than a Type4-PDCCH CSS set for multicast DCI formats, in the cell with the lowest index containing CSS, if any; otherwise, to the Type4-PDCCH set for multicast DCI formats or to the USS set with the lowest index in the cell with lowest index. The lowest CSS set index, or the lower USS set index is determined over all CSS sets or USS sets, respectively, with at least one PDCCH candidate in overlapping PDCCH monitoring occasions. For the purpose of determining the CORESET, a SS/PBCH block is considered to have different QCL 'typeD' properties than a CSI-RS. Additionally, for the purpose of determining the CORESET, a first CSI-RS associated with a SS/PBCH block in a first cell and a second CSI-RS in a second cell that is also associated with the SS/PBCH block are assumed to have same QCL 'typeD' properties. The allocation of non-overlapping CCEs and of PDCCH candidates for PDCCH monitoring is according to all search space sets associated with the multiple CORESETs on the active DL BWP(s) of the one or more cells. The number of active TCI states is determined from the multiple CORESETs.

In addition to PDCCH MOs over a same time instance, such as a symbol of a slot, overlapping PDCCH occasions can include PDCCH MOs separated by a time smaller than or equal to a value of a parameter timeDurationForQCL-PDCCH, wherein a value of timeDurationForQCL-PDCCH is a number of OFDM symbols for a corresponding SCS, such as an SCS of 60 kHz or larger, and can be reported by the UE as a capability. When PDCCH MOs overlap on active DL BWPs of corresponding cells that use different SCS, a value of timeDurationForQCL-PDCCH can be the larger, in absolute time, of the corresponding values for the different SCS. The UE capability for timeDurationForQCL-PDCCH can be same as a UE capability corresponding to a minimum number of OFDM symbols that the UE requires to receive a PDCCH that provides a DCI format scheduling a PDSCH reception and apply for the PDSCH reception a spatial QCL information obtained from the DCI format.

The method 1000 as illustrated in FIG. 10 describes a UE procedure for determining CORESETs, with same or different qcl-Type set to 'typeD' properties, to monitor PDCCH in overlapping PDCCH monitoring occasions according to this disclosure.

Based on a configuration of search space sets associated with CORESETs for PDCCH receptions on an active DL BWP of a cell, wherein the CORESETs are associated with TCI states having 'typeD' properties (spatial properties), a UE (such as the UE 116) determines PDCCH candidates in overlapping PDCCH MOs in the CORESETs (step 1010). In step 1020, the UE subsequently determines whether any of the PDCCH MOs is associated with a CSS set other than a CSS set for PDCCH receptions only for detection of multicast DCI formats, which is a CSS set other than a Type4-PDCCH CSS set. When a PDCCH MO is associated with a CSS set other than a Type4-PDCCH CSS set (as determined in step 1020), the UE in step 1030 monitors PDCCHs only in a CORESET, and in any other CORESET from the multiple CORESETs that have been configured with qcl-Type set to same 'typeD' properties, corresponding to the CSS set with the lowest index. Alternatively, when none of the PDCCH MOs is associated with a CSS set other than a Type4-PDCCH CSS set (as determined in step 1020), the UE in step 1040 monitors PDCCHs only in a CORESET, and in any other CORESET from the multiple CORESETs that have been configured with qcl-Type set to same 'typeD' properties, corresponding to the Type-4 PDCCH set or to the USS set with the lowest index. When the CORESETs are in multiple cells and any of the above two conditions are satisfied for more than one cells, the UE monitors PDCCH in CORESETs of a cell with a smallest index.

In certain embodiments, when a UE (such as the UE 116) drops Type4-PDCCH CSS sets and the UE is configured to transmit a PUCCH with NACK when the UE does not correctly receive a transport block associated with a multicast service, the UE does not transmit the PUCCH to avoid unnecessarily consuming power and generating interference as a serving gNB is aware that the UE dropped the Type4-PDCCH CSS sets.

Although FIG. 10 illustrates the method 1000 various changes may be made to FIG. 10. For example, while the method 1000 is shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe an indication for PDCCH monitoring depending on service/RNTI type. This is described in the following examples and embodiments, such as those of FIG. 11.

FIG. 11 illustrates an example method 1100 for a UE to receive an indication for whether to start a drx-onDuration-Timer for a next DRX cycle to monitor PDCCH for detection of DCI formats associated with a G-RNTI according to embodiments of the present disclosure. The steps of the method 1100 of FIG. 11 can be performed by any of the UEs 111-119 of FIG. 1, such as the UE 116 of FIG. 3. The method 1100 is for illustration only and other embodiments can be used without departing from the scope of the present disclosure.

Embodiments of the present disclosure describe procedures to indicate to a UE whether or not to monitor PDCCH during an active time of a DRX cycle wherein the indication includes groups search space sets for DCI formats associated with groups of RNTIs.

In certain embodiments, a UE (such as the UE 116) configured with DRX mode operation can be provided parameters for detection of a DCI format 2_6 in a PDCCH reception on a primary cell. The parameters include a location in DCI format 2_6 of a Wake-up indication bit by ps-PositionDCI-2-6, wherein a '0' value or a '1' value for the Wake-up indication bit, when reported to higher layers, indicates to not start or to start, respectively, the drx-onDurationTimer for a next DRX cycle. The DRX cycle can be only a long cycle or can be both a short and a long DRX cycle. For a UE supporting multiple service types and having separate corresponding traffic buffers at a serving gNB, the UE may not need to start the corresponding drx-onDurationTimer for a next DRX cycle for any service type, such as when all respective traffic buffers are empty, or may need to start the corresponding drx-onDurationTimer for a next DRX cycle for any combination of service types such as when respective traffic buffers are not empty or when a service type requires low latency. Instead of having a binary indication for whether the UE monitors PDCCH during a next DRX cycle, it is beneficial to provide an indication with increased granularity that can include the service type for which the UE should monitor PDCCH during a next DRX cycle. The service type can be identified by a RNTI used to scramble the CRC of a DCI format, or by a size of a DCI format, or by a group of search space sets.

For example, when a UE is configured for both unicast and multicast services, a DCI format 2_6 can include 2 bits for the UE wherein a value '00' indicates to not start any drx-onDurationTimer for a next DRX cycle, a value '01' indicates to start the drx-onDurationTimer for the next DRX cycle and not monitor PDCCH candidates for a first group of search space sets, a value '10' indicates to start the drx-onDurationTimer for the next DRX cycle and not monitor PDCCH candidates for a second group of search space sets, and a value '11' indicates to start each drx-onDurationTimer for the next DRX cycle and monitor PDCCH candidates for each corresponding group of search space sets.

In a first realization, the first and second groups of search space sets can be indicated by higher layers, for example by indicating search space set indexes for the first group and search space set indexes for the second group. For the first realization, the procedure can be generally applicable depending on scheduling requirements for a UE at a next DRX cycle and does not depend on support of multiple service types.

In a second realization, the first and second groups can be determined based on an association of RNTIs of DCI formats with the first and second groups of search space sets, such as by associating search space sets for DCI formats with CRC scrambled by a G-RNTI with the first group and associating search space sets for DCI formats with CRC scrambled by a C-RNTI or a CS-RNTI or an MCS-C-RNTI with the second group.

In a third realization, the first and second groups can be determined based on an association of DCI formats with the first and second groups of search space sets, such as by associating search space sets for DCI format 0_1 or DCI format 1_1 with the first group and associating search space sets for DCI format 0_2 and 1_2 with the second group.

In a fourth realization, a UE ignores a corresponding Wake-up indication bit value in DCI format 2_6 for PDCCH receptions according to search space sets in the first group where, for example, the first group includes search space sets associated with multicast DCI formats such as DCI formats with CRC scrambled by a G-RNTI. The UE applies the corresponding Wake-up indication bit value in DCI format 2_6 for PDCCH receptions according to search space sets in the second group where, for example, the second group includes search space sets associated with unicast DCI formats such as DCI formats with CRC scrambled by a C-RNTI.

For multicast traffic, instead of increasing a field size from 1 bit to 2 bits per UE in order to indicate whether the UE should monitor PDCCH for multicast traffic (such as for DCI formats scrambled by a G-RNTI), or for unicast traffic (such as for DCI formats scrambled by a C-RNTI), or for both, a bitmap can be added in DCI format 2_6 to indicate whether or not a UE should monitor PDCCH for a set of G-RNTIs in a next DRX cycle. This approach can be advantageous for UEs supporting more than one multicast services as the indication for PDCCH monitoring can be per multicast service through a corresponding G-RNTI. A UE configured search space sets for DCI formats with CRC scrambled with one or more G-RNTIs can be indicated a location in the bitmap or in DCI format 2_6 for the indication of a corresponding G-RNTI. The UE can also be indicated a size of the bitmap. The bitmap can be located at the beginning of DCI format 2_6. For example, a UE configured first search space sets for monitoring PDCCHs for detection of first DCI formats, such as DCI formats with CRC scrambled by a first G-RNTI, and second search space sets for monitoring PDCCH for detection of second DCI formats, such as DCI formats with CRC scrambled by a second G-RNTI, can be indicated a third bit location in DCI format 2_6 for a bit that indicates whether or not the UE should start a first drxonDurationTimer for the next DRX cycle to monitor PDCCH for detection of the first DCI formats and a fifth bit location in DCI format 2_6 for a bit that indicates whether or not the UE should start a second drx-onDurationTimer for the next DRX cycle to monitor PDCCH for detection of the second DCI formats.

The method 1100, as illustrated in FIG. 11, describes an example procedure for a UE to receive an indication for whether or not to start a drx-onDurationTimer for a next DRX cycle to monitor PDCCH for detection of DCI formats associated with a G-RNTI according to the disclosure.

In step 1110, a UE (such as the UE 116) is provided first search space sets to monitor PDCCHs providing DCI formats with CRC scrambled by one or more of a C-RNTI, a CS-RNTI, and an MCS-C-RNTI, and second search space sets to monitor PDCCHs providing DCI formats with CRC scrambled by one or more G-RNTI. In step 1120, the UE is provided third search space sets to monitor PDCCHs for detection of a DCI format 2_6 and the UE is indicated a location in the DCI format 2_6 for a wake-up indication field comprising of 2 bits. In step 1130, the electronic device determines whether a wake-up indication is to start dx-onDurationTimer for the next DRX cycle. For example, a wake-up indication field with a value '00', indicates that the UE should not start any drx-onDurationTimer for a next DRX cycle. For another example, a wake-up indication field with a value '01', '10', or '11', indicates that the UE should start first, second, or both first and second drx-onDuration-Timer and respectively monitor the first, second, or both the first and second groups of search space sets. That is, the UE receives the DCI format 2_6 and determines whether the indication is to start any drx-onDurationTimer for the next DRX cycle. When a wake-up indication field value is '00' (as determined in step 1130), the UE in step 1140 does not start any drx-onDurationTimer for the next DRX cycle and does not monitor PDCCHs according to the first or the second search space sets for the next DRX cycle. When a wake-up indication field value is '01', '10', or '11' (as determined in step 1130), the UE in step 1150 starts corresponding first, second, or both first and second drx-onDu-rationTimer for the next DRX cycle and respectively monitors PDCCHs according to the first, second, or both the first and second groups of search space sets.

In general, a UE can be indicated $N_{group}$ groups of search space sets, for example by being provided indexes of search space sets for each of the $N_{group}$ groups of search space sets, and a field of $\log_2(N_{group}+1)$ bits in DCI format 2_6 can indicate whether the UE should not start a drx-onDuration-Timer for a group of search space sets for the next DRX cycle, or whether the UE should start the drx-onDuration-Timer for the group of search space sets for the next DRX cycle and monitor PDCCH according to the group of search space sets with group index from one of 1, 2, . . . , $N_{group}$.

A UE can also be indicated to monitor PDCCH for a specific service type during a DRX cycle when the Active Timer is running. For example, a field of 1 bit in a multicast DCI format can indicate whether the UE continues to monitor PDCCH for Type4-PDCCH CSS sets associated with a G-RNTI used to scramble the CRC of the multicast DCI format during the DRX cycle when the Active Timer is running. The same mechanism can be used for a unicast DCI format and corresponding PDCCH monitoring according to USS sets.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure describe sizes of DCI formats with CRC scrambled by G-RNTI for scheduling multicast. This is described in the following examples and embodiments, such as those of FIG. 12.

FIG. 12 illustrates an example method 1200 for a UE to determine a size for a multicast DCI format according to embodiments of the present disclosure. The steps of the method 1200 of FIG. 12 can be performed by any of the UEs 111-119 of FIG. 1, such as the UE 116 of FIG. 3. The method 1200 is for illustration only and other embodiments can be used without departing from the scope of the present disclosure.

Embodiments of the present disclosure describe mechanisms for enabling support of multicast DCI formats under limits for a total number of sizes of DCI formats that a UE is expected to support. In the following, size can refer to a number of bits.

A UE (such as the UE 116) expects to monitor PDCCH candidates for DCI formats having up to four sizes that include up to three sizes of DCI formats with CRC scrambled by C-RNTI per serving cell. As a multicast DCI format is intended to be decoded by more than one UE, a size of the multicast DCI format cannot be same as a size of a UE-specific unicast DCI format. For example, unicast DCI formats 0_1/1_1/0_2/1_2 can include a field for a first UE and not include the field for a second UE or can include a field with a first size for a third UE and with a second size for a fourth UE. Further, although unicast DCI formats 0_0/1_0 include predetermined fields with predetermined size per field, a corresponding size is also UE-specific as a frequency-domain resource allocation (FDRA) field indicates RBs in an active UL/DL BWP for a UE, the active UL/DL BWP is UE-specific can have different sizes for different UEs, and therefore a size of the FDRA field in DCI formats 0_0/1_0 for PDCCH receptions according to USS sets is UE-specific.

Unicast DCI format 1_0 that is provided by a PDCCH that a UE monitors according to a CSS set has a same size for all UEs having a same primary cell as a size of a FDRA field is determined either by a first CORESET that the UEs are provided during initial access or by an initial DL BWP that the UE are provided by a system information block (SIB) for the primary cell. Further, unlike a DCI format 0_0 that is provided by a PDCCH that a UE monitors according to a CSS set, a UE-specific size adjustment is never performed for the size of DCI format 1_0 in order for a UE to maintain the specified limits for the number of sizes of the DCI formats that the UE is expected to decode. Therefore, a size of a multicast DCI format can be specified to be same as a size of a DCI format 1_0 that is provided by PDCCHs that a UE monitors according to a CSS set.

When a UE is configured to monitor a second multicast DCI format, having a different size than the first multicast DCI format, whether the size of the second DCI format is same as a size of a unicast DCI format or a size of a DCI format 2_0/2_1/2_4 that is provided by a PDCCH that the UE monitors according to a CSS set can be indicated by a serving gNB by indicating a size of the second multicast DCI format. It is noted that a size of DCI format 2_2/2_3 is same as a size of DCI format 1_0 that is provided by a PDCCH that a UE monitors according to a CSS set. For example, the serving gNB can indicate that the second multicast DCI format is counted separately from the unicast DCI formats when a size of the second multicast DCI format is same as a size of a DCI format 2_0/2_1/2_4 or when the serving gNB does not configure the UEs that decode the second multicast DCI format to also decode a DCI format 2_0/2_1/2_4. Conversely, for example when the conditions for indicating that the second multicast DCI format is counted separately from the unicast DCI formats do not apply, the serving gNB can indicate that the second multicast DCI format is counted as part of the unicast DCI formats and that indication can then further be considered in a size matching procedure for the unicast DCI formats by also considering the second multicast DCI format as a unicast DCI format.

The method 1200 as illustrated in FIG. 12 describes an example procedure for a UE to determine a size for a multicast DCI format according to the disclosure.

In step 1210, a UE (such as the UE 116) is configured to decode a multicast DCI format having a size. In step 1220, the UE is provided an indication by a serving gNB for whether the UE should count the size of the multicast DCI format as for a unicast DCI format. In step 1230, the UE determines whether the indication is for counting the size of the multicast DCI format as for a unicast DCI format. When the indication is to count the multicast DCI format as a DCI format with CRC scrambled by a C-RNTI (unicast DCI format) (as determined in step 1230), the UE in step 1240 performs additional size matching for the unicast DCI formats, when needed. Alternatively, when the indication is to not count the multicast DCI format (as determined in step 1230) as a DCI format with CRC scrambled by a C-RNTI and the UE is configured to decode one or more of the DCI formats 2_0/2_1/2_4, the UE in step 1250 expects the multicast DCI format to have a same size as one or more of the DCI formats 2_0/2_1/2_4.

In another approach, a serving gNB (such as the BS 102) can ensure that a size of a second multicast DCI format is same as a size of another DCI format that is also decoded by UEs configured to decode the second multicast DCI format. A tradeoff for this approach is that it avoids a UE procedure for potentially having to perform additional size matching for unicast DCI formats but places the burden on the serving gNB to indicate a size of the second multicast DCI format that is same as a size of another DCI format that the UE is configured to decode.

A UE (such as the UE 116) may also be scheduled to simultaneous receptions of a first PDSCH by a first DCI format with a G-RNTI and of a second PDSCH by a second DCI format with a C-RNTI when the UE does not have a capability for simultaneous PDSCH receptions. Such an event can occur because the first PDSCH reception is by multiple UEs and is not practically feasible to preclude scheduling the first PDSCH reception when a UE from the multiple UEs also needs to be scheduled the second PDSCH reception.

In a first approach and when priority values, when any, indicated/determined by the first and second DCI formats are same, the UE can prioritize the second PDSCH reception (and drop the first PDSCH reception). The prioritization can be regardless of whether a last symbol of a second PDCCH providing the second DCI format is before or after a last symbol of a first PDCCH providing the first DCI format. That is, the prioritization can be regardless of whether or not the first PDSCH is scheduled before or after the second PDSCH.

In a second approach and when priority values, when any, indicated/determined by the first and second DCI formats are same, a serving gNB can indicate by higher layers to the UE whether the UE should prioritize the first PDSCH reception or the second PDSCH reception or such prioritization can be specified in the system operation, such as to prioritize a unicast PDSCH reception over a multicast PDSCH reception. The indication can apply in general or only when a last symbol of a second PDCCH providing the second DCI format is before a last symbol of a first PDCCH providing the first DCI format. For both the first and second approaches, a PDSCH reception can be conditioned on corresponding processing timelines as described in REF3 and REF4.

When a priority value indicated/determined by the first DCI format is different than a priority value indicated by the second DCI format, the UE prioritizes the PDSCH reception that is scheduled by the DCI format indicating the larger priority value.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:

receiving, from a base station, first information for search space sets for reception of first physical downlink control channels (PDCCHs) providing at least one of a first multicast downlink control information (DCI) or a second multicast DCI;

receiving, from the base station, second information for a size of a DCI format, wherein the first multicast DCI or the second multicast DCI is associated with scheduling a multicast physical downlink shared channel (PDSCH) reception;

receiving, from the base station, a first multicast PDSCH scheduled by the first multicast DCI;

receiving, from the base station, a second multicast PDSCH scheduled by the second multicast DCI; and determining an alignment of sizes for DCI formats, wherein a size of a format of the first multicast DCI is same as a size of a format of a first unicast DCI associated with scheduling a first unicast PDSCH reception, wherein a size of a format of the second multicast DCI is equal to the size indicated by the second information, wherein the format of the first unicast DCI, the format of the first multicast DCI, and the format of the second multicast DCI are excluded from the alignment of sizes for DCI formats, and wherein a PDCCH providing the first unicast DCI is received based on a common search space.

2. The method of claim 1, wherein the format of the first unicast DCI is DCI format 1_0.

3. The method of claim 1, wherein:

a second unicast PDSCH reception and a third multicast PDSCH reception overlap in time, in case that a first priority value associated with the second unicast PDSCH reception is larger than a second priority value associated with the third multicast PDSCH reception, the second unicast PDSCH reception is performed, and in case that the second priority value is larger than the first priority value, the third multicast PDSCH reception is performed.

4. The method of claim 1, wherein in case that (i) a second unicast PDSCH reception and a third multicast PDSCH reception overlap in time and (ii) a first priority value associated with the second unicast PDSCH reception is the same as a second priority value associated with the third multicast PDSCH reception, only the second unicast PDSCH reception is performed.

5. The method of claim 1, wherein in case that (i) a second unicast PDSCH reception and a third multicast PDSCH reception overlap in time and (ii) a first priority value associated with the second unicast PDSCH reception is the same as a second priority value associated with the third multicast PDSCH reception, one of the second unicast PDSCH reception or the third multicast PDSCH reception is performed.

6. The method of claim 5, wherein the UE does not have a capability for simultaneous PDSCH receptions.

7. A user equipment (UE) comprising:

a transceiver configured to:

receive, from a base station, first information for search space sets for reception of first physical downlink control channels (PDCCHs) providing at least one of a first multicast downlink control information (DCI) or a second multicast DCI, receive, from the base station, second information for a size of a DCI format, wherein the first multicast DCI or the second multicast DCI is associated with scheduling a multicast physical downlink shared channel (PDSCH) reception, receive, from the base station, a first multicast PDSCH scheduled by the first multicast DCI, and receive, from the base station, a second multicast PDSCH scheduled by the second multicast DCI; and a processor operably coupled to the transceiver, the processor further configured to determine an alignment of sizes for DCI formats, wherein a size of a format of the first multicast DCI is same as a size of a format of a first unicast DCI associated with scheduling a unicast PDSCH reception, wherein a size of a format of the second multicast DCI is equal to the size indicated by the second information, wherein a format of the first unicast DCI, a format of the first multicast DCI, and a format of the second multicast DCI are excluded from the alignment of sizes for DCI formats, and wherein a PDCCH providing the first unicast DCI is received based on a common search space.

8. The UE of claim 7, wherein the format of the first unicast DCI is DCI format 1_0.

9. The UE of claim 7, wherein:

a second unicast PDSCH reception and a third multicast PDSCH reception overlap in time, in case that a first priority value associated with the second unicast PDSCH reception is larger than a second priority value associated with the third multicast PDSCH reception, the second unicast PDSCH reception is performed, and in case that the second priority value is larger than the first priority value, the third multicast PDSCH reception is performed.

10. The UE of claim 7, wherein in case that (i) a second unicast PDSCH reception and a third multicast PDSCH reception overlap in time and (ii) a first priority value associated with the second unicast PDSCH reception is the same as a second priority value associated with the third multicast PDSCH reception, only the second unicast PDSCH reception is performed.

11. The UE of claim 7, wherein in case that (i) a second unicast PDSCH reception and a third multicast PDSCH reception overlap in time and (ii) a first priority value associated with the second unicast PDSCH reception is the same as a second priority value associated with the third multicast PDSCH reception, one of the second unicast PDSCH reception or the third multicast PDSCH reception is performed.

12. The UE of claim 7, wherein the UE does not have a capability for simultaneous PDSCH receptions.

13. A base station comprising:

a transceiver configured to:

transmit, to a user equipment (UE), first information for search space sets for transmission of first physical downlink control channels (PDCCHs) providing at least one of a first multicast downlink control information (DCI) or a second multicast DCI, and transmit, to the UE, second information for a size of a DCI format, wherein the first multicast DCI or the second multicast DCI is associated with scheduling a multicast physical downlink shared channel (PDSCH) transmission, transmit, to the UE, a first multicast PDSCH scheduled by the first multicast DCI, and transmit, to the UE, a second multicast PDSCH scheduled by the second multicast DCI, wherein an alignment of sizes for DCI formats is indicated, wherein a size of a format of the first multicast DCI is same as a size of a format of a first unicast DCI associated with scheduling a unicast PDSCH transmission, wherein a size of a format of the second multicast DCI is equal to the size indicated by the second information, and wherein a format of the first unicast DCI, a format of the first multicast DCI, and a format of the second multicast DCI are excluded from the alignment of sizes for DCI formats, wherein a PDCCH providing the first unicast DCI is transmitted based on a common search space.

14. The base station of claim 13, wherein the format of the first unicast DCI is DCI format 1_0.

15. The base station of claim 13, wherein:

a second unicast PDSCH transmission and a third multicast PDSCH transmission overlap in time, in case that a first priority value associated with the second unicast PDSCH transmission is larger than a second priority value associated with the third multicast PDSCH transmission, the second unicast PDSCH transmission is performed, and in case that the second priority value is larger than the first priority value, the third multicast PDSCH transmission is performed.

16. The base station of claim 13, wherein in case that (i) a second unicast PDSCH transmission and a third multicast PDSCH transmission overlap in time and (ii) a first priority value associated with the second unicast PDSCH transmission is the same as a second priority value associated with the third multicast PDSCH transmission, only the second unicast PDSCH transmission is performed.

17. The base station of claim 13, wherein in case that (i) a second unicast PDSCH transmission and a third multicast PDSCH transmission overlap in time and (ii) a first priority value associated with the second unicast PDSCH transmission is the same as a second priority value associated with the third multicast PDSCH transmission, one of the second unicast PDSCH transmission or the third multicast PDSCH transmission is performed.

* * * * *